United States Patent
Goelitz et al.

(10) Patent No.: US 10,819,677 B2
(45) Date of Patent: Oct. 27, 2020

(54) ADDRESS MIGRATION SERVICE

(71) Applicant: Amazon Technologies, Inc., Seattle, WA (US)

(72) Inventors: Jason Goelitz, Oakton, VA (US);
Leonid Nikolayev, Vienna, VA (US);
Daniel Ralph Paquette, Ashburn, VA (US); Anupam Pandey, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 19 days.

(21) Appl. No.: 16/036,804

(22) Filed: Jul. 16, 2018

(65) Prior Publication Data
US 2020/0021556 A1 Jan. 16, 2020

(51) Int. Cl.
*G06F 15/16* (2006.01)
*H04L 29/12* (2006.01)

(52) U.S. Cl.
CPC ...... *H04L 61/2084* (2013.01); *H04L 61/2007* (2013.01); *H04L 61/2061* (2013.01)

(58) Field of Classification Search
CPC . H04L 41/0886; H04L 41/0893; H04L 41/12; H04L 45/02; H04L 45/021; H04L 45/04; H04L 45/586; H04L 45/72
See application file for complete search history.

(56) References Cited

U.S. PATENT DOCUMENTS

| | | | |
|---|---|---|---|
| 8,751,691 B1 * | 6/2014 | Brandwine | H04L 61/2521 709/238 |
| 8,775,629 B1 | 7/2014 | Whittle | |
| 9,628,294 B1 * | 4/2017 | Brandwine | H04L 12/4641 |
| 10,263,951 B2 * | 4/2019 | Kielhofner | H04L 61/2564 |
| 2013/0044636 A1 * | 2/2013 | Koponen | H04L 61/103 370/254 |
| 2014/0025770 A1 * | 1/2014 | Warfield | G06F 16/256 709/213 |
| 2015/0200845 A1 * | 7/2015 | Roskind | H04L 69/22 370/241 |
| 2016/0248795 A1 * | 8/2016 | Chien | H04L 63/0245 |
| 2017/0063632 A1 * | 3/2017 | Goliya | H04L 41/12 |

(Continued)

FOREIGN PATENT DOCUMENTS

| | | |
|---|---|---|
| EP | 2797295 A1 | 10/2014 |
| GB | 2504987 A | 2/2014 |

OTHER PUBLICATIONS

International Search Report and Written Opinion for related International Application No. PCT/US2019/042067, dated Oct. 10, 2019, 12 pages.

*Primary Examiner* — Moustafa M Meky
*Assistant Examiner* — Thorne E Waugh
(74) *Attorney, Agent, or Firm* — Nicholson De Vos Webster & Elliott LLP

(57) ABSTRACT

Techniques for address migration are described. An address migration service can receive a request to migrate an address space to a provider network, the request including at least one range of addresses. The AMS service can authorize the request with an internet registry and provision the address space in at least one area of the provider network. The AMS can receive a request to advertise the address space, advertise the address space, and allocate at least one address in the address space to at least one resource in the provider network.

20 Claims, 13 Drawing Sheets

(56) References Cited

U.S. PATENT DOCUMENTS

| | | | |
|---|---|---|---|
| 2017/0126496 A1* | 5/2017 | Sikand | H04L 41/0886 |
| 2018/0007178 A1* | 1/2018 | Subhraveti | G06F 9/547 |
| 2019/0007342 A1* | 1/2019 | Wang | H04L 61/2521 |
| 2019/0036868 A1* | 1/2019 | Chandrashekhar | H04L 45/021 |

* cited by examiner

700 —

702 — start-migration --prefix ADDR_PREFIXES --description "DESCRIPTION" /* Validates addresses and returns an address pool*/

704 — describe-migration-status --pools MIG_POOL /*describes the status of migration*/

706 — assign-pool-location --pool MIG_POOL -- location REGION /* Assign area to pool*/

708 — deploy-pool --pool MIG_POOL /*deploys the pool to make it available in the region*/

710 — advertise-migration --pool MIG_POOL /* Start advertising */

712 — withdraw-advertising --pool MIG_POOL /* Stop advertising */

714 — deprovision-migration --prefix ADDR_PREFIXES /* Remove addresses from system */

716 — undeploy-pool --pool MIG_POOL /*removes the pool from the region*/

718 — describe-pools --area AREA_ID /*provides pool info for pools in area*/

720 — allocate-address --area AREA_ID --domain DOMAIN_ID --pool POOL_ID /*specify pool to allocate from*/

722 — allocate-address --area AREA_ID --domain DOMAIN_ID --address ADDRESS /*specify particular address to allocate*/

FIG. 7

ADDRESS MIGRATION SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which:

FIG. 7 is a diagram illustrating example application programming interfaces (API) for address migration according to some embodiments.

DETAILED DESCRIPTION

Various embodiments of methods, apparatus, systems, and non-transitory computer-readable storage media for address migration are described. According to some embodiments, address migration enables customers to move all or part of their existing publicly routable network address space (e.g., an Internet Protocol (IP) version 4 (IPv4) and/or IP version 6 (IPv6) address space) to a provider network (e.g., one or more data centers and the technology used by a service provider to provision resources) for use within the provider network. Once the address space has been migrated into the provider network, the addresses may be added to an address pool and assigned to the customer's resources (e.g., compute instances, storage instances, database instances, load balancers, network address translation (NAT) gateways, etc.).

Previously, customers having their own public IP address space were unable to migrate that address space to a provider network. As a result, if a customer were to move their resources from their datacenter to the provider network, new IP addresses would be assigned to those resources by the provider network. However, an address space may be a valuable commodity to a customer. For example, reliability or other performance benchmarks of a service may be calculated for a particular IP address or range of IP addresses. Additionally, legacy configurations may rely on specific IP addresses or IP address ranges to perform properly. For example, an IP address range may be whitelisted by a legacy workload, such that any change of IP address out of the whitelisted range would require significant reconfiguration of legacy client devices. By providing address migration, these services may continue to operate seamlessly, and with the same performance benchmarks, after the underlying resources have been migrated to a provider network.

When network addresses are migrated to the provider network, the customer may maintain ownership of the network addresses and the provider network may take over advertisement of the network addresses on the internet. The migrated address space can then be used by the customer like other any other address space within the provider network. For example, the customer can use an IPv4 network address space for auto-assigning public IPs or allocating IP manually allocating static IP addresses, and network addresses from an IPv6 space can be given to private networks and, through a given private network, to subnets and instances or other resources.

Figure 1:
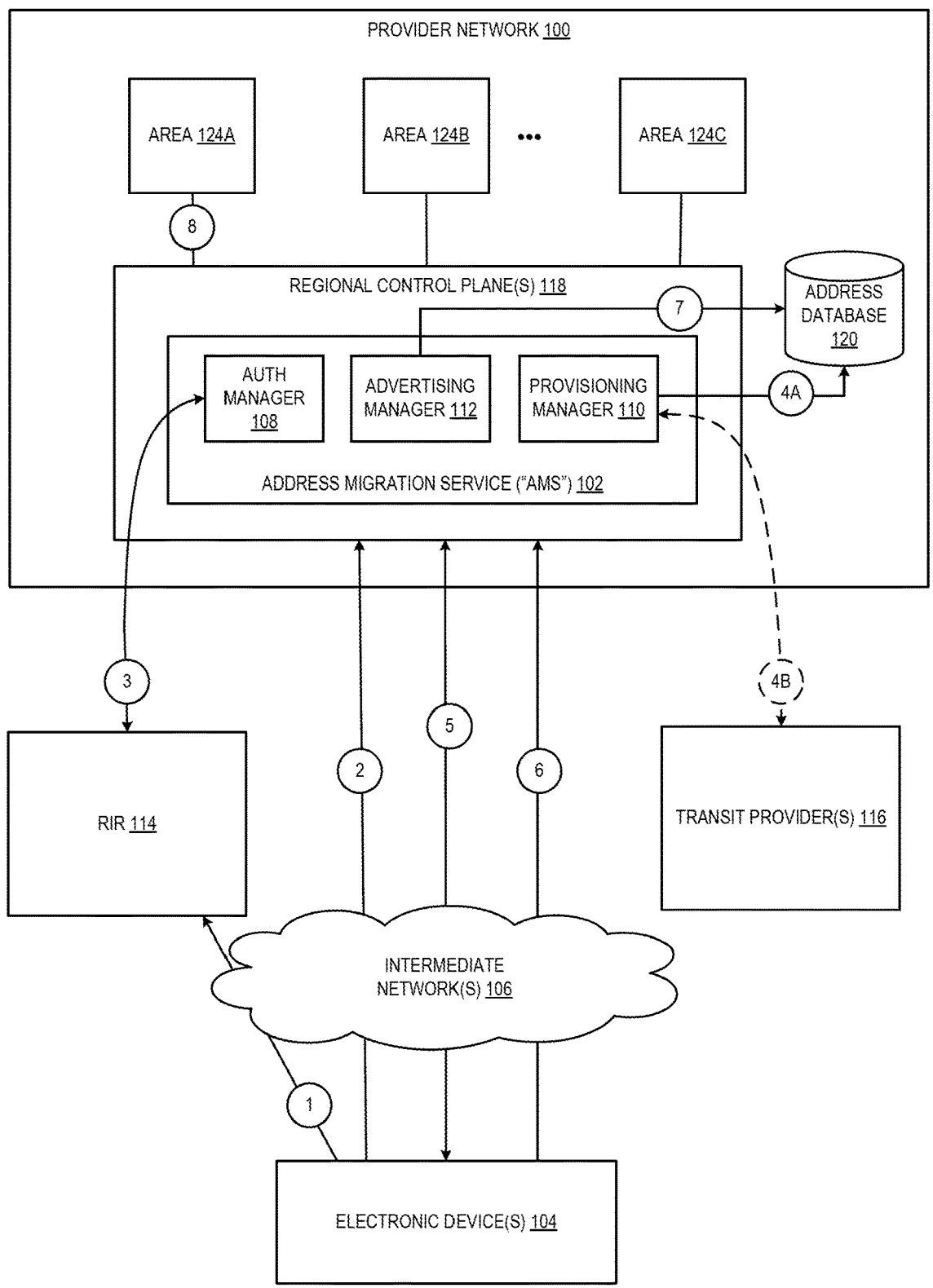
FIG. 1 is a diagram illustrating an environment for address migration according to some embodiments.

FIG. 1 is a diagram illustrating an environment for address migration according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console implemented as a website or application, etc. The interface(s) may be part of, or serve as a front-end to, one or more regional control planes 118 of the provider network 100, each of which includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In some embodiments, a provider network 100 may include multiple areas, such as areas 124A-124C. Each area may be logically isolated from the other (and from any other areas not shown within provider network 100). For example, each area may be a distinct logical data center, supported by one or more physical data centers, and each area may have its own power supply and networking infrastructure to limit the likelihood of a failure in one area from affecting another area. In some embodiments, the areas 124A-124C may be located in the same general location of provider network 100 (e.g., organized into a region) which may include resources located in the same geographic area (e.g., state, country, part of a country, etc.). By dividing provider network 100 into various regions and areas, the data and customer instances stored therein can be protected against failure events. For example, a failure in the first area 124A may not impact the resources in the second area 124B. Likewise, a failure in one geographic region may not affect resources located in another geographic region. As shown in FIG. 1, a regional control plane 118 may control multiple areas 124A-124C located within a given geographic region. In some embodiments, each region may have its own regional control plane. In some embodiments, different areas of a provider network may have their own control planes. Note, however, that in some embodiments a provider network 100 may have fewer locations and/or the relationship between regions and areas may be different. For example, a service provider may only offer services at logical data center or at a region level of abstraction. As such, this disclosure is not limited to any specific way of implementing a provider network in areas.

In some embodiments, to migrate address space to the provider network 100, at numeral 1 a customer, using electronic device(s) 104, updates a route origin authorization (ROA) associated with their address space at a regional internet registry (RIR) 114 to include an identifier associated with the provider network. This update may be performed by sending one or more electronic commands to the RIR 114, which may be carried by HyperText Transfer Protocol (HTTP) messages or using other protocols. In some embodiments, the update may be performed by uploading an updated file, reading one or more updates from a message queue, or other update technique. An ROA may include an autonomous system number (ASN) associated with the service provider that is authorized to advertise the address space (e.g., one or more IP prefixes). Additionally, the RIR may maintain a WHOIS record that identifies the owner or assignee of the address space. If the WHOIS record is out of date, customer name has changed, etc., then the customer can update the WHOIS record to indicate that the customer is the owner or assignee of the address space.

At numeral 2, a customer can send (via an electronic device 104) a request to an address migration service ("AMS") 102 to migrate one or more address ranges to provider network 100. In some embodiments, the request can include one or more address prefixes to be migrated and may optionally include a description for each prefix. The network address space (e.g., an IPv4 Classless Inter-Domain Routing (CIDR) block, e.g., 172.31.0.0/20 or 10.0.0.0/16, or alternatively an IPv6 CIDR block, e.g., 2600:1f16:67d:2000::/156) may be referred to as an address space. In some embodiments, a customer may specify one or more subnets of their address space (i.e., less than an entire address space controlled by the customer) to be migrated to the provider network 100. For example, a customer can select a CIDR block 123.123.0.0/24, which supports 256 IP addresses, to be migrated, even though the customer may (or may not) control a larger CIDR block of addresses (e.g., 123.123.0.0/16, which includes over 64K addresses).

The request to migrate address space can be (directly, or indirectly via a control plane entity hosting an application programming interface (API) endpoint (e.g., a URL of a server or service configured to process HTTP or similar web service commands)) received from a customer device (e.g., electronic device 104) at an AMS 102 in a provider network 100. In some embodiments, the request may be an API request to an API endpoint of the provider network 100 to start migration. Additionally, or alternatively, the request may be made through a console or other user interface. The request can include the address range or ranges to be migrated (e.g., one or more prefixes to be migrated). Optionally, the request can include a description for each range being migrated.

At numeral 3, once the request has been received, AMS can validate ownership of the address space and determine whether the provider network is authorized to advertise the address space. In some embodiments, an authorization manager 108 can request an ROA associated with the address space from RIR 114. For example, AMS can determine whether the ROA includes an identifier (e.g., an ASN) associated with the provider network 100 and whether the ROA and/or WHOIS record indicates that the requestor is the owner and/or assignee of the address space. In some embodiments, the ROA may include encrypted authorization information. The encrypted authorization information may identify the owner (e.g., name, account, or other identifier) of the address space who is authorized to migrate the address space. In some embodiments, a key to decrypt the authorization information can be provided in (or identified in) the request to migrate. In another embodiment, the encrypted authorization information could be decryptable using a key (e.g., a symmetric or private key of a public/private key pair) held by or accessible to the authorization manager 108. For example, at 1 above the customer could encrypt data with a key and place the encrypted data in the ROA. Then at 3 AMS can decrypt the data with a copy of the key (if symmetric encryption is used) or a private key (if asymmetric encryption is used). Additionally, or alternatively, a customer can add a record to the domain name service (DNS) entry associated with their address space. The record may include information similar to the encrypted authorization information discussed above. Authorization manager 108 can perform a reverse DNS lookup to retrieve the record and use the record to determine whether the account is authorized to migrate the address space.

At numeral 4A, following the authorization and validation of the address space, the address space can be provisioned into provider network 100. As shown, a provisioning manager can add a new entry to address database 120, the new entry corresponding to the address space. The entry may further identify the area or areas of the provider network to which the address space is provisioned. As discussed further below, a route server orchestrator in the regional control plane can pull the address space from the address database and provision to each specified area. In some embodiments, as shown at 4B, the provisioning manager 110 notifies one or more transit providers, which peer with the provider network, of an intent by the provider network to advertise the address space. In some embodiments, such notifications can include updating a routing registry, such as the Routing Assets Database (RADb) or similar, to indicate that the address space will be advertised by the provider network. In some embodiments, transit provider notification may include a message sent to a carrier indicating the address space and the intent to advertise by the provider network 100.

At numeral 5, the customer can request a status of the migration. Depending on the address space being migrated, the validation and notification processes described above can take varying amounts of time. During this time, a status request can be sent to AMS 102 from customer device 104. The status request can include or identify the involved address space (e.g., the prefix or prefixes being migrated, or another identifier such as a unique identifier generated by the provider network 100 for the migration) and can return a status message indicating whether the migration is complete. Alternatively, in other embodiments, the AMS 102 can notify the customer of the migration status (or changes of migration status) using other techniques, such as sending an email, updating an entry in a database or data store, sending a short message service (SMS) message, or via use of another notification technique known to those of skill in the art.

Once the migration is complete, the customer can select an area (and/or region, etc.) to which to deploy the address space. In some embodiments, the area (and/or region, etc.) can be selected automatically by provider network 100. Once the address space has been deployed, it can be used to auto-assign public addresses to resources (e.g., compute instances, load balancers, gateways, storage instances, private networks, etc.), and/or used by the customer "manually" to assign particular public addresses to particular resources, etc.

Further, once the migration is complete the address space is added to the regional control plane 118 and is ready to be advertised. Advertisements can be controlled by the customer, enabling them to coordinate advertising from their datacenter and from the provider network 100 (e.g., to stop advertising from the datacenter before starting advertisement from the provider network). At this point the address space can be used. For example, a customer can configure resources using addresses from the address space. This enables the customer to set up their infrastructure such that once advertising begins, and traffic is directed to the provider network, their system is ready to be used.

At numeral 6, once the migration is complete, a request to advertise the address space can be received by AMS 102 from customer device 104. As indicated above, in some embodiments it is beneficial for a customer to send (via electronic device 104) a request to begin advertising the address space when the customer has (or is about to) discontinue advertising the address space from the previous location (e.g., datacenter) to allow for a smooth update of routing information and thus, prevent routing problems of traffic involving the address space.

At numeral 7, an advertising manager 112 can update the new entry for the migrated address space in address database 120 to indicate the area (and/or region, etc.) that is to advertise the address space and that advertising is to start from that area (and/or region). At numeral 8, the regional control plane 118 can pull the CIDRs or the prefixes from the address database 120 and instruct route servers and/or routers in the corresponding area to begin advertising the address space within the provider network and out to the internet (e.g., using one or more routing protocols known to those of skill in the art, such as Border Gateway Protocol (BGP), Open Shortest Path First (OSPF), Routing Information Protocol (RIP), Intermediate System to Intermediate System (IS-IS), Enhanced Interior Gateway Routing Protocol (EIGRP), etc.). In some embodiments, the address space can be advertised by the provider network before it has been deployed. In some embodiments, advertisements may be made from multiple areas/regions so that data is routed into the provider network 100 quickly and then routed internally by the provider network to the appropriate resource.

Figure 2A:
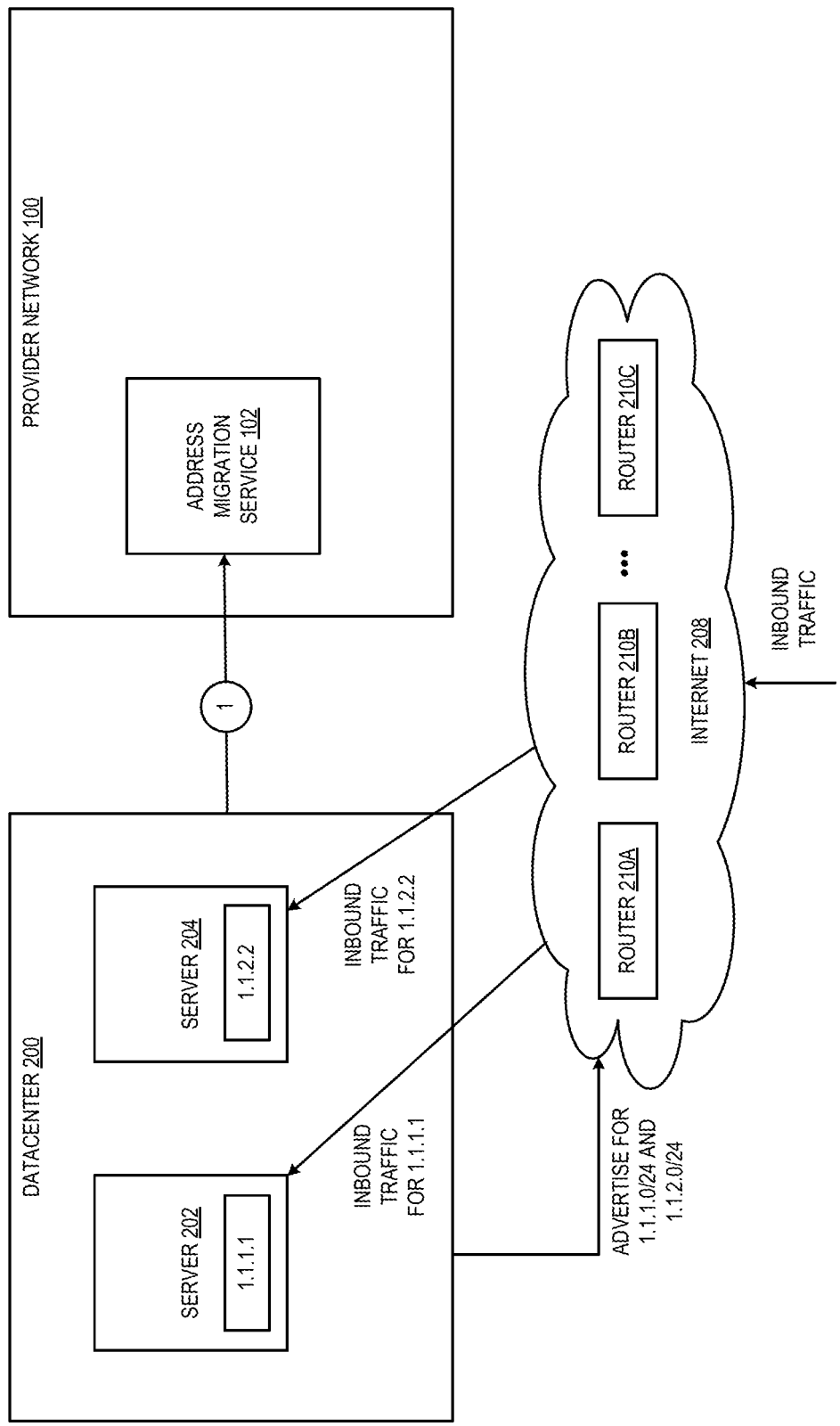
FIGS. 2A and 2B are diagrams illustrating an example of address migration according to some embodiments.
Figure 2B:
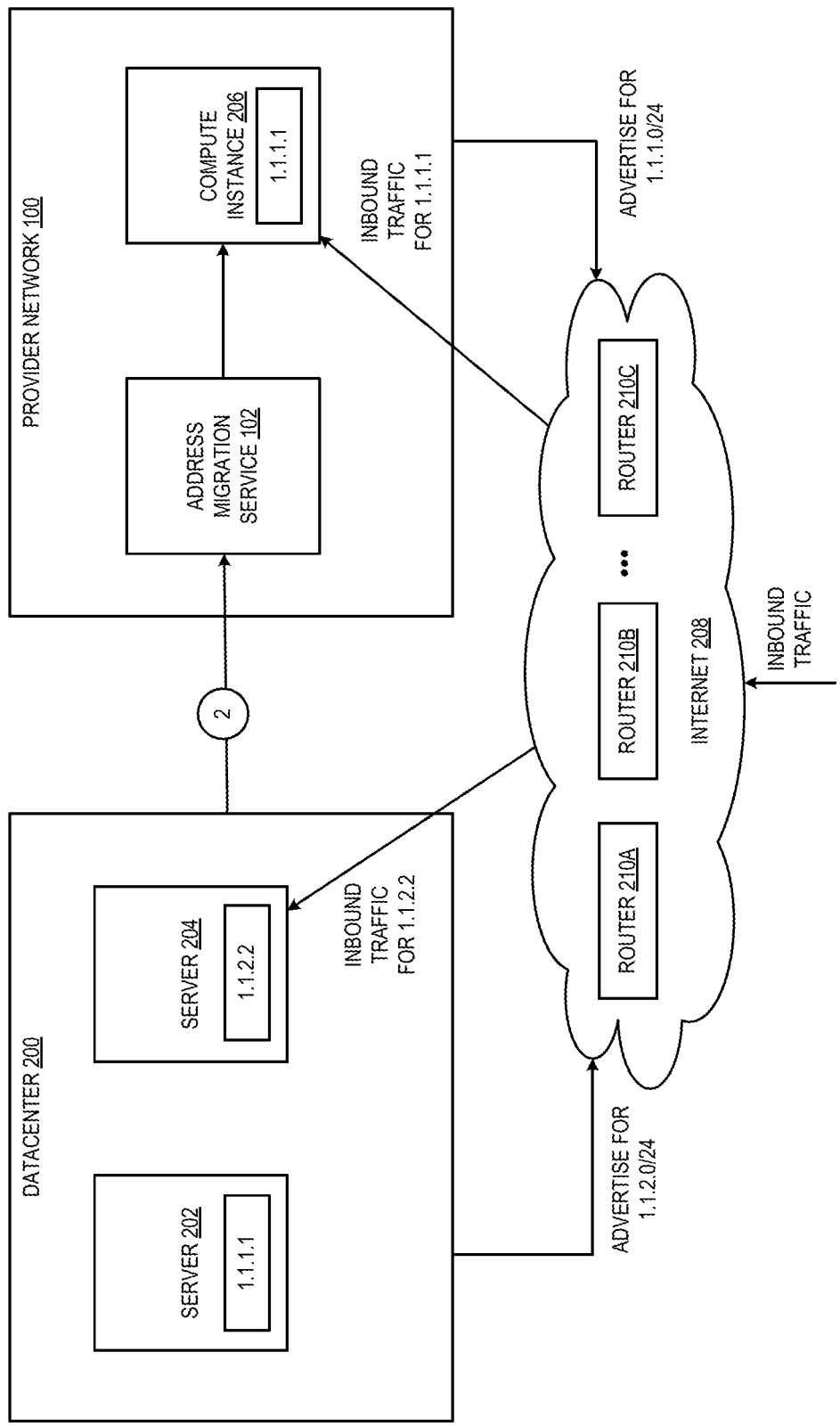

FIGS. 2A and 2B are diagrams illustrating an example of address migration according to some embodiments. As shown in FIG. 2A, a customer datacenter 200 (e.g., a private datacenter, colocation facility, etc.) can host various servers 202, 204 and advertise routes to addresses assigned to these servers. For example, the smallest IP prefix that can be advertised is a/24, which means that at least 256 addresses may be advertised at a time. The datacenter may advertise multiple prefixes or CIDRs. In the example shown in FIG. 2A, the datacenter is advertising 1.1.1.0/24 and 1.1.2.0/24. Server 202 is assigned an IP address 1.1.1.1 from the 1.1.1.0/24 prefix and server 204 is assigned an IP address 1.1.2.2 from the 1.1.2.0/24 prefix. As a result, traffic destined for these servers is routed to datacenter 200, e.g., through internet 208 via one or more of the various routers 210A-210C. At numeral 1, a request to migrate the 1.1.1.0/24 prefix can be sent to address migration service 102, which is shown as being issued by a device within the datacenter 200, though in some scenarios the request may alternatively be issued by a device outside the datacenter 200 (e.g., at a private residence, office, within the provider network 100, etc.). As discussed above, AMS 102 can validate the address space and authorize the migration.

As shown in FIG. 2B, once the migration is complete, addresses from the migrated prefix can be assigned to resources in provider network 100. For example, a compute instance 206 can be assigned the address 1.1.1.1 when it is launched by the customer, the same address assigned to server 202. In some embodiments, an address can be assigned to an instance when it is launched. For example, the customer can select a specific address to be assigned to the instance or can select a particular address pool from which to assign to the instance. In some embodiments, the customer may indicate that the address is to be auto-assigned by the provider network from the migrated address space to the instances. In some embodiments, an address may be assigned from the migrated address space to an account associated with the customer, this address may then be used to direct traffic to resources owned by that customer. For example, the address assigned to the customer's account may direct traffic to a compute instance owned by the customer. If that compute instance fails, traffic may be redirected to a second instance owned by the customer in the provider network. In some embodiments, configuration details of an instance may be modified to add an address from the migrated address space or remove an address from the instance and return the address to the migrated address space (e.g., to be assigned to a different instance). With the new infrastructure set up in provider network 100, the customer at numeral 2 (again, from within the datacenter 200 or outside the datacenter 200) can send a request to AMS 102 to advertise the migrated prefix. In some embodiments, prior to sending the advertising request, the customer can stop the datacenter 200 from advertising the migrated prefix using techniques known to those of skill in the art. As shown, the customer may cause the datacenter 200 to only continue advertising the 1.1.2.0/24 prefix. After the advertising request is received by AMS 102, the provider network can begin advertising the 1.1.1.0/24 prefix. The routes for this prefix may then be updated by routers 210A-210C in the internet 208. As a result, inbound traffic for addresses in the 1.1.2.0/24 prefix may continue to be routed to datacenter 200 while inbound traffic for addresses from the 1.1.1.0/24 prefix is now routed to provider network 100. For example, traffic destined for 1.1.1.1 is now routed to compute instance 206 in provider network 100.

In some embodiments, the customer can control whether the provider network or the datacenter is advertising a given address space or portion of an address space. For example, the customer can migrate an address space to provider network 100 from datacenter 200. As discussed, the address space may be migrated but not advertised by provider network 100, enabling traffic to continue to be routed to the datacenter 200. The customer may choose to advertise a/24 prefix portion of the address space in provider network 100 while continuing to advertise a different/24 prefix portion of the address space from the datacenter 200.

Figure 3:
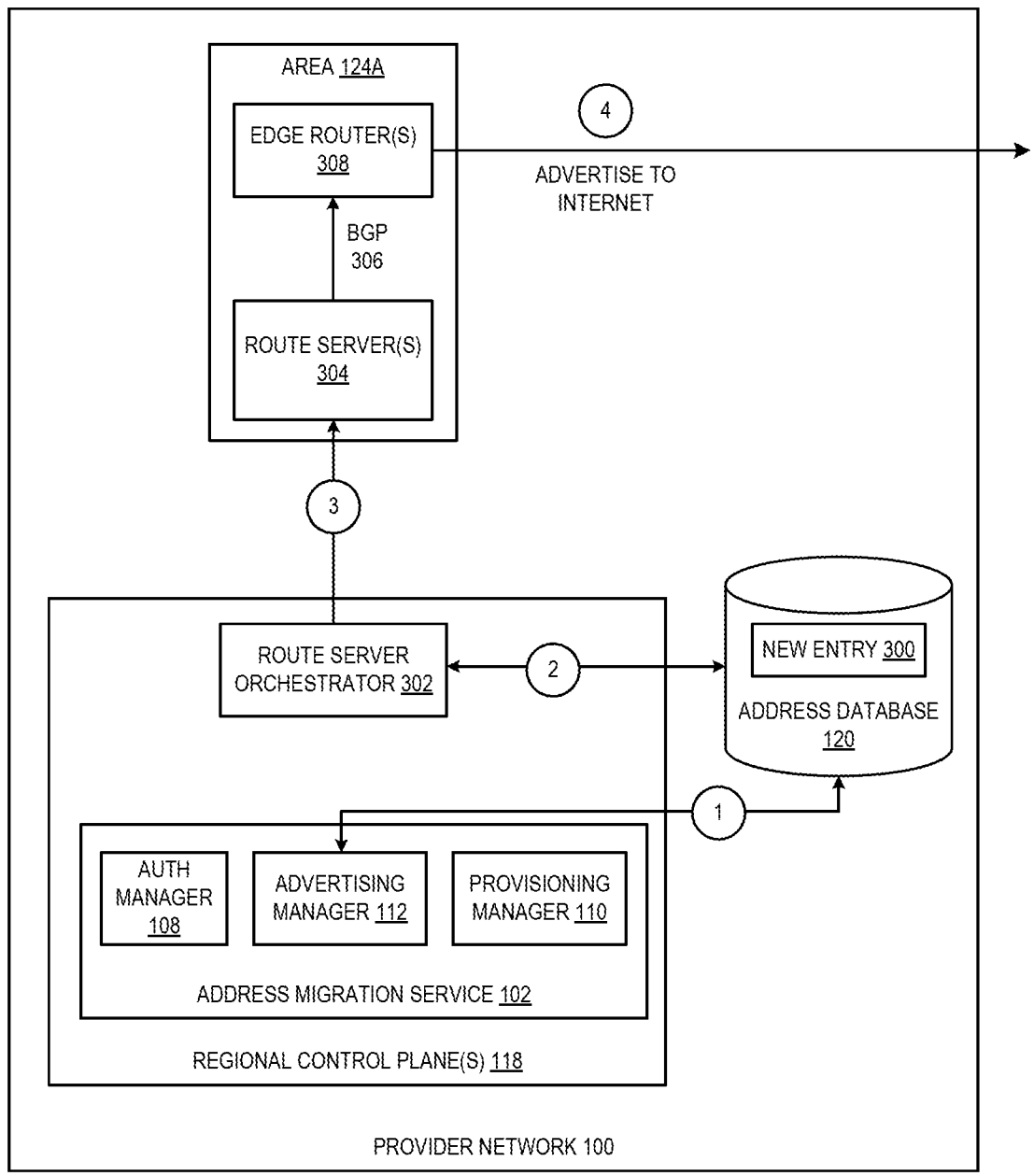
FIG. 3 is a diagram illustrating an environment for address migration according to some embodiments.

FIG. 3 is a diagram illustrating an environment for address migration according to some embodiments. At numeral 1, as described above, after a request to advertise an address space is received, a new entry 300 for the address space is added to the address database 120 by advertising manager 112. The entry can identify the address space that has been migrated and the area and/or region which is to advertise the address space. In some embodiments, regional control plane 118 can include a route server orchestrator 302. In various embodiments, as discussed further below, route server orchestrator can manage the addition and withdrawal of routes to and from route servers in various areas. At numeral 2, the route server orchestrator 302 can retrieve the new entry 300 from the address database. In some embodiments, the route server orchestrator can regularly check address database 120 for new entries. In some embodiments, when a new entry is identified, the new entry along with the rest of the address spaces in the address database can be retrieved to be advertised. In some embodiments, each region and/or area of provider network 100 may include its own address database 120.

At numeral 3, the route server orchestrator 302 can read data from the address database 120 and determine addresses to advertise for the customer and a location to advertise the addresses. Continuing with the example above, the route server orchestrator 302 can determine to send the address space to a route server 304 local to the area 124A which is to advertise the address space. The route server 304 can peer with one or more edge routers 308, e.g., over a border gateway protocol (BGP) connection 306. A given area of the provider network, such as area 124A, may include a plurality of route servers in the substrate layer of the provider network. The route server orchestrator 302 can read the addresses from the address database and push the addresses to the route servers 304. Each route server 304 can add the addresses to their route tables. In some embodiments, the route server orchestrator 302 can take the entire set of addresses in the database and push them to the router servers 304 and edge routers 308. The route servers can peer with edge routers 308 and dynamically instruct (e.g., using BGP or another protocol) the edge routers to advertise address spaces based on the advertising instructions received from the route server orchestrator 302. At numeral 4, the edge servers 308 can then begin advertising the address space within the provider network 100 and push advertisements out into the internet.

Figure 4:
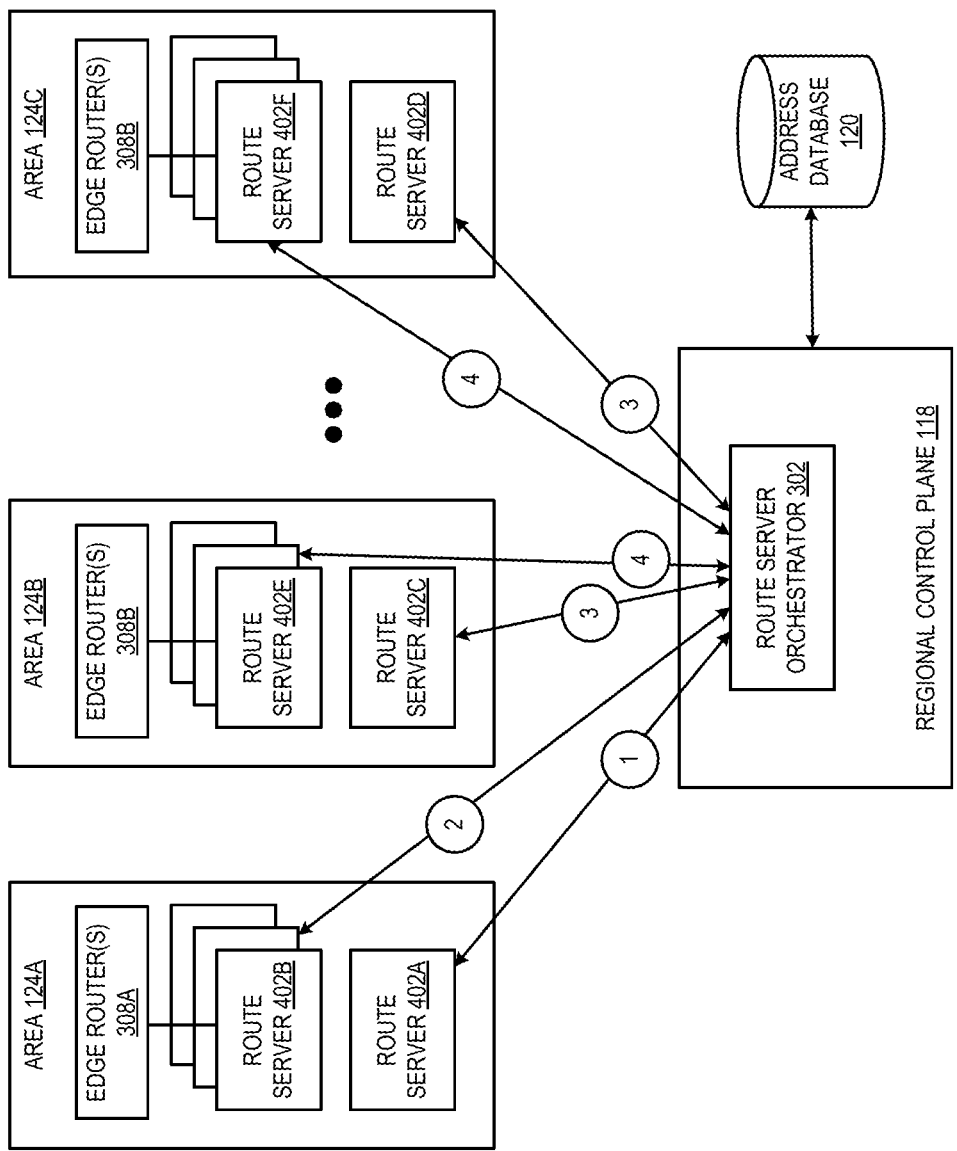
FIG. 4 is a diagram illustrating a route server orchestrator according to some embodiments.

FIG. 4 is a diagram illustrating operations of a route server orchestrator according to some embodiments. As shown in FIG. 4, regional control plane 118 can include a route server orchestrator 302. When a new route is to be added to provider network 100, the route server orchestrator 302 can read the updated entry or entries from address database 120. At numeral 1, the route server orchestrater 302 can push the new address space to a first route server 402A in area 124A. The route server orchestrator 302 can then read the routes back from the route server 402A and the edge servers 308A. If successful, at numeral 2, the route server orchestrator 302 can push the updated address space to the remaining route servers 402B in that area 124A. The route servers 402B can then be tested again. If successful, then at numeral 3, the new address space can be pushed to one route server 402C, 402D in each area 124B, 124C. These new routes may be tested as before. If the testing is successful, then the new address space can be pushed to the remaining route servers 402E, 402F in the remaining areas 124B, 124C, as shown at numeral 4. Although the embodiment described above adds routes to be advertised, a similar process may be performed to remove routes from being advertised. In various embodiments, a new address space may be advertised from multiple areas in the same region of a provider network.

In some embodiments, testing may include querying the edge routers 308A-308C to determine whether they are advertising the new address space. For example, if the new address space is to be advertised in area 124A, the edge router 308A can be queried to ensure it is advertising the new space. In some embodiments, the edge routers may be queried using simple network management protocol (SNMP) or other network protocol. This testing enables verification that the new route is being advertised properly and that the addition of the route has not caused the edge router to fail.

When a route is withdrawn, for example if a customer instructs AMS 102 to stop advertising an address space, this testing may not indicate that the route has been withdrawn since only one route server has been instructed to stop advertising (e.g., the other route servers in the area are still instructing the edge server to advertise). Additionally, or alternatively, the edge router can be queried to determine which route server is instructing the edge router to advertise. For example, the edge route can be accessed to obtain the advertisement state and/or the edge router can be instructed to output its advertisement state to another server, storage location, or other location to be queried.

Embodiments are described above for migrating and provisioning address space into a provider network. In various embodiments, address space may also be deprovisioned and removed from the provider network in a similar manner. For example, a customer may send an undeploy request to the account migration service to remove a pool from a deployed region. One or more checks may be performed to ensure that no addresses from the pool are currently in use and then the pool may be undeployed from the region. Similarly, a customer may send a deprovision migration request to the account migration service to remove the migrated addresses from the system. A similar process of updating the address database(s), regional control planes, route servers, etc. may then be performed to remove the address space from the provider network.

Addresses, such as IP addresses, have generally been grouped by CIDR. However, groupings by CIDRs are generally inflexible. For example, a CIDR does not allow a user to have five addresses, the customer is limited to powers of two (e.g., four addresses, eight addresses, etc.). This may lead to wasted addresses. Accordingly, an address pool can be created which allows for an arbitrary grouping of addresses from a customer's address space. For example, an address pool can have one or more CIDRs, one or more individual addresses, or a combination thereof. As such, the address pool becomes an address management resource, enabling the customer to divide their address space into one or more address pools which may then be assigned to resources in the provider network. In some embodiments, an address space may be added to an address pool when the address space is migrated in. In some embodiments, a pool may be created and addresses added to, or removed from, the address pool as needed. This enables customers to define address groupings that meet their infrastructure needs, without wasting addresses.

Figure 5A:
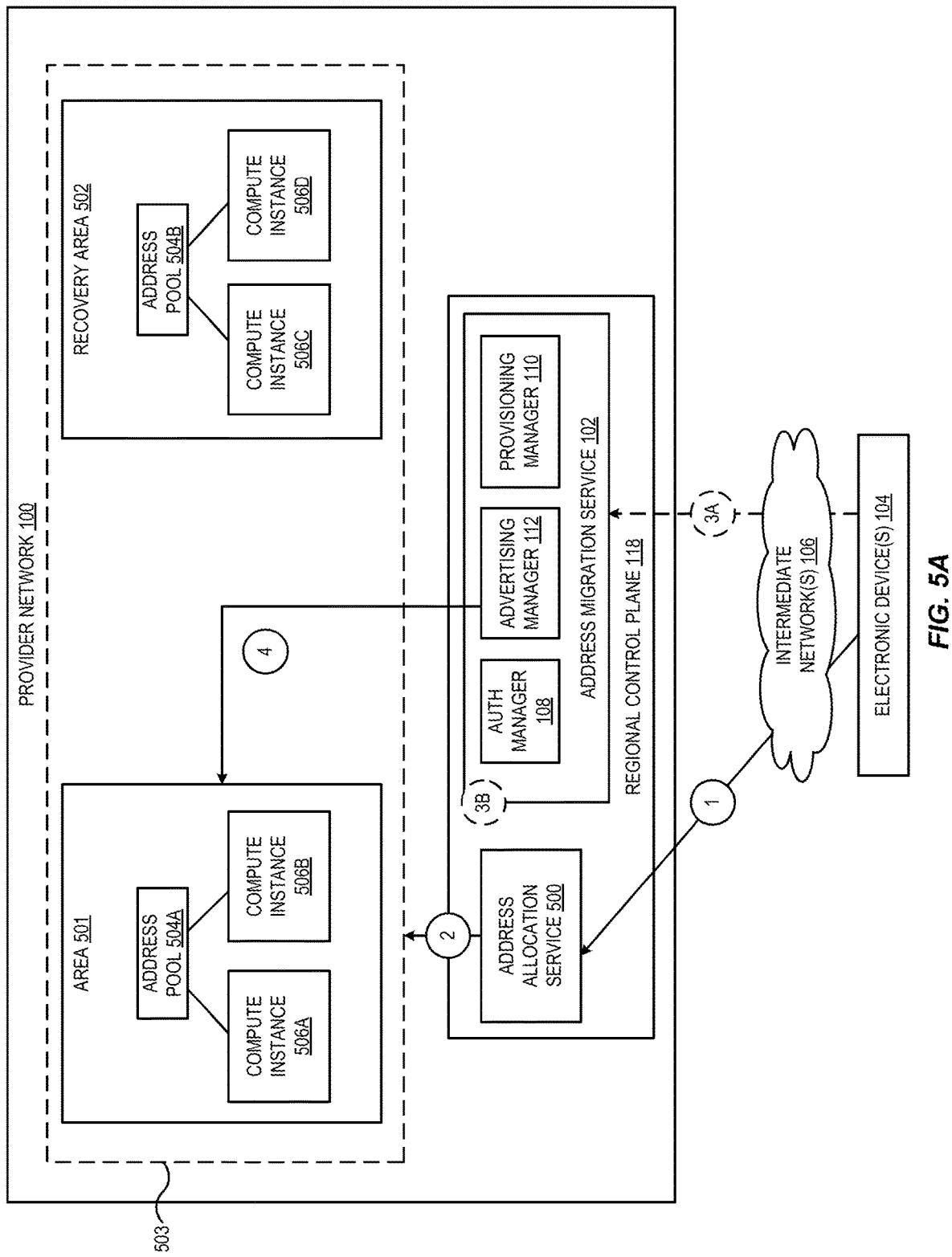
FIGS. 5A and 5B are diagrams illustrating an example of address migration in disaster recovery according to some embodiments.
Figure 5B:
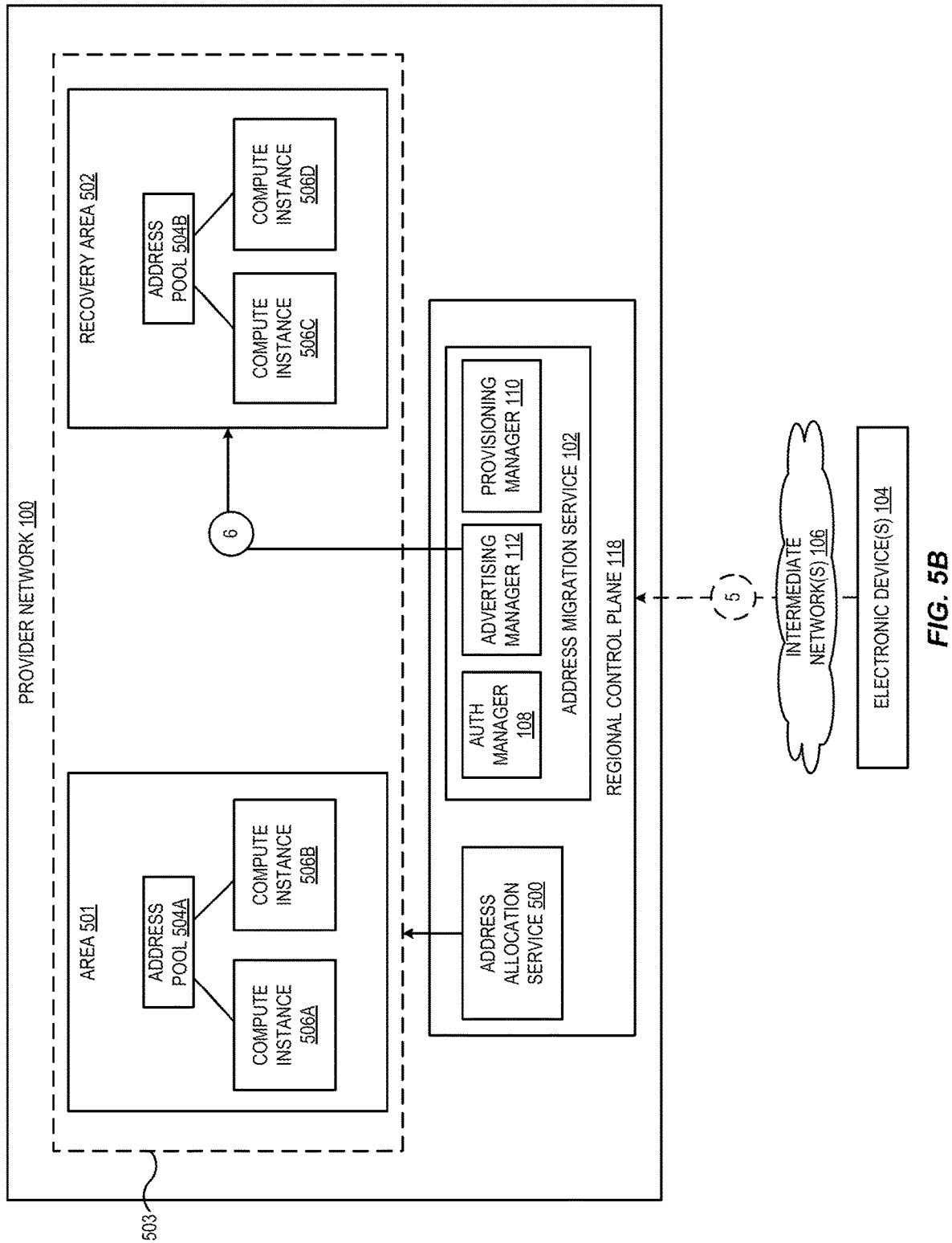

FIGS. 5A and 5B are diagrams illustrating an example of address migration in disaster recovery according to some embodiments. As shown in FIG. 5A, regional control plane 118 can include an address allocation service 500. In some embodiments, the address allocation service 500 can be provided in a separate control plane. As discussed, when an address space is migrated into provider network 100, an address pool can be created. The customer can assign the pool to a location (e.g., one or more areas 503 and/or regions of the provider network) and can deploy the pool to one or more locations where it may be used to assign addresses to resources. For example, at numeral 1, the address allocation service 500 can receive a request originated by a customer device 104 to create IP pool 504A in area 501 and 504B in area 502. At numeral 2, the IP pool can be assigned to area 501 and the edge routers in that area can be instructed to advertise the address space corresponding to the IP pool. Compute instances 506A and 506B can be allocated IP addresses from IP pool 504A in area 501.

In some embodiments, the address space may be provisioned into multiple areas and/or regions of the provider network. This enables infrastructure to be created in each region and allocated addresses from the address space. The address space may be advertised from a single region of the provider network at a time. However, by provisioning to multiple regions, if one region fails, or there is another need to change the region being advertised, the advertisements can be stopped in the old region and started in a new region. Once the route update has been propagated, traffic will be routed to the infrastructure in the new region rather than the old region. Accordingly, in the example shown in FIG. 5A, recovery area 502 can include infrastructure including compute instances 506C and 506D which have been allocated the same IP addresses as compute instance 506A and 506B. Because area 501 is advertising the address space, any traffic bound for the allocated IP addresses is routed to compute instances 506A and 506B.

In some embodiments, each address pool 504A, 504B can include a collection of addresses from one or more address spaces that have been migrated into provider network 100. Addresses may then be allocated to resources, such as compute instances 506, from the address pool. For example, each pool can include discontiguous addresses, such as two different/24 prefixes, or other ranges of addresses. A given pool can be expanded to include additional address space being migrated in or additional address space, or particular addresses, available through provider network 100. Addresses may be auto-assigned (or statically or manually assigned) to resources from the address pool when the resources are created, and returned to the pool when a resource is removed.

As discussed, recovery area 502 can be preconfigured for disaster recovery by setting up a corresponding address space in the area. For example, once recovery area 502 has been provisioned with the address space, addresses can be allocated from IP pool 504B to compute instances 506C and 506D. These addresses may be the same as those allocated to compute instance 506A and 506B. However, if only area 501 is advertising, then no live (or production) traffic is being routed to recovery area 502 using these addresses (although, in some embodiments, compute instance 506A-506D may be assigned other private or public network addresses to allow for configuration traffic, etc., to be sent to the compute instances 506A-506D). By setting up a recovery region 502, the infrastructure can be fast swapped during disaster recovery. As shown in FIG. 5A, if area 501 fails, AMS 102 can stop the advertising of the address space from area 501, which may be responsive to a command from a user (at numeral 3A) and/or responsive to detecting the failure (at numeral 3B, such as via heartbeat monitoring, receiving an alert generated by a monitoring service, etc.). At numeral 4, the AMS 102 can cause the route servers to be updated to remove the routes to the address space from the advertisements in area 501, as described above with respect to FIG. 4. In some embodiments, the failure of an area can be detected automatically, and the advertisements can be stopped. Depending on the failure of the area, the advertisements may be stopped due to the failure, though, and thus the messaging shown at numeral 4 may or may not be performed.

As shown in FIG. 5B, following the failure of area 501, at numeral 5, an advertising request can be sent to AMS 102 to update the advertising of the address space from area 501 to recovery area 502. The advertising can be updated as described above with respect to FIG. 4, at numeral 6. As indicated above with regard to FIG. 5A, in some embodiments, after a failure is detected, the advertising may be updated automatically without a request from a customer at optional numeral 5. As such, if one area fails, the advertising may be updated and the new infrastructure can begin receiving traffic.

In some embodiments, if the address space has not been provisioned to a backup area, a rapid provisioning process can be performed to provision to a new area. For example, because the address space has already been migrated into provider network 100, the validation, authorization, and carrier notification steps described above with respect to FIG. 1, can be skipped and the address space can be added to the regional control plane in the new backup area and/or region to which the address space is being deployed. The embodiment described with respect to FIGS. 5A and 5B shows disaster recovery between different areas of provider network 100. In some embodiments recovery may be performed from the customer datacenter to the provider network, similarly to the process described above.

Figure 6:
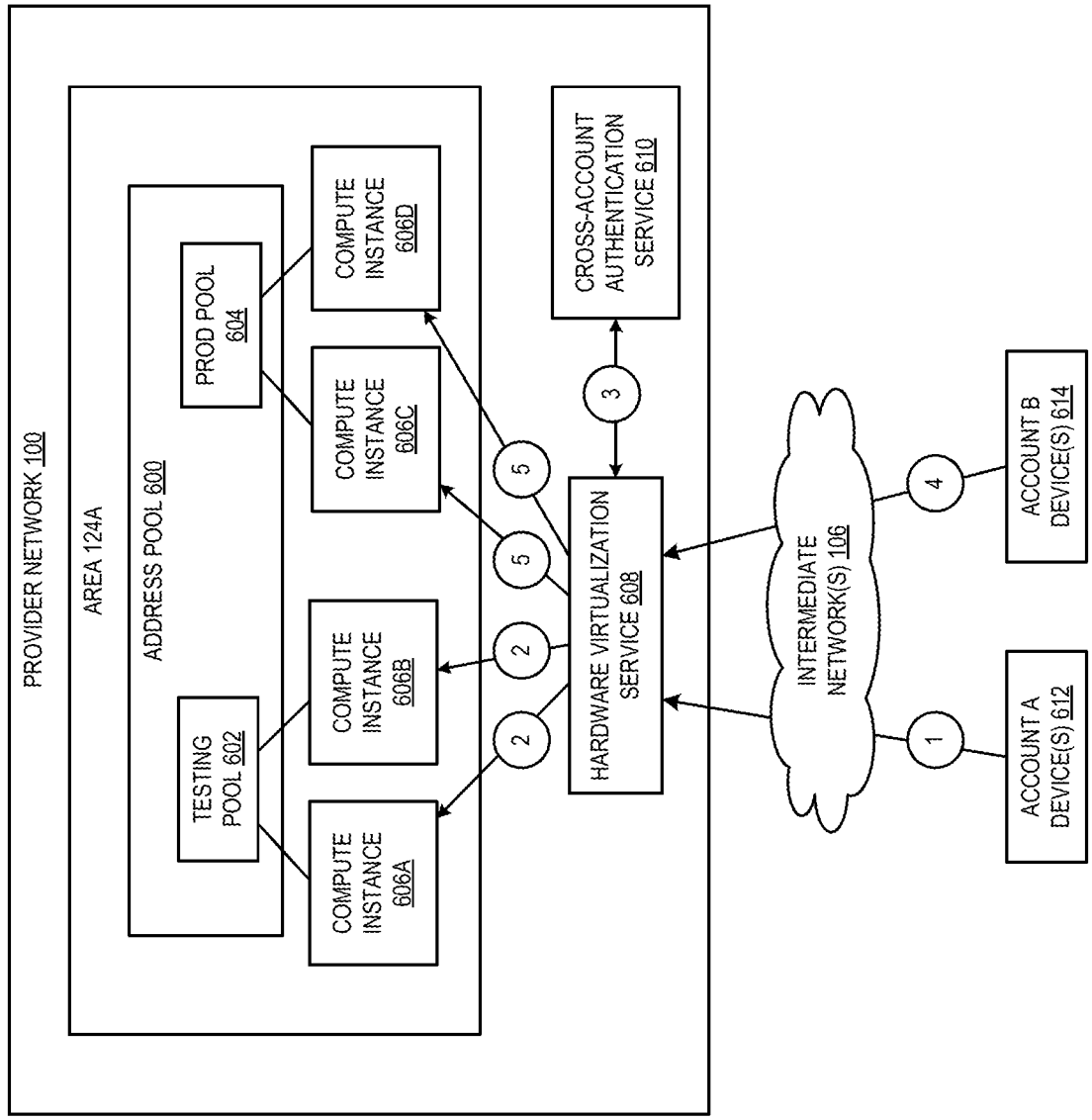
FIG. 6 is a diagram illustrating an environment for cross account usage of migrated address space according to some embodiments.

FIG. 6 is a diagram illustrating an environment for cross account usage of migrated address space according to some embodiments. As shown in FIG. 6, an address pool 600 can be created from a migrated address space. An address pool can be a provider network object with an associated provider network identifier. Authentication services, such as cross-account authentication service 610, can then apply access control rules to the address pool to control how, and by whom, addresses can be allocated from and/or returned to the address pool.

In some embodiments, an address pool may be split into multiple sub pools 602, 604. Addresses from each pool may be allocated to resources created by particular accounts, based on access control policies. For example, address pool 600 can be divided into a testing sub pool 602 and a production sub pool 604. At numeral 1, a device associated with Account A 612, representing a testing team, can request compute instances 606A and 606B from hardware virtualization service 608 for use in testing. At numeral 2, the hardware virtualization service 608 can create the requested instances and request addresses from address pool 600. To determine which sub pool to allocate addresses from, at numeral 3, hardware virtualization service 608 can check with a cross-account authentication service 610 to determine which sub pool is authorized to allocate addresses to resources owned by account A. Similarly, at numeral 4, account B, which may represent a production team, can request compute instances from hardware virtualization service 608. Hardware virtualization service 608 can create compute instances 606C and 606D at numeral 5. These instances can be allocated addresses from production sub pool 604 based on the account policies managed by cross-account authentication service 610. By managing access to each sub pool in this way, a testing team member is prevented from accidentally creating a resource and allocating that resource a production address. In some embodiments, the when an account requests a new instance be created, the request may specify a particular address pool from which to allocate the address for the instance. Cross-account authentication service 610 can determine whether the account is authorized to obtain an address from the requested pool. If the account is authorized, an address can be allocated and, if the account is not authorized, the request can be denied.

FIG. 7 is a diagram illustrating example application programming interfaces (APIs) 700 for address migration according to some embodiments. As shown in FIG. 7, various APIs may be implemented as described above. For example, a start-migration 702 command may be called to begin the address migration process described above. The start-migration command may receive one or more address prefixes and optionally may include a description for each prefix. In some embodiments, the start migration command may return an address pool identifier corresponding to a new address pool created with the address space being migrated. In some embodiments, the start migration command may include an address pool field. If provided, the new address space being migrated may be added to the specified address pool. A describe-migration-status 704 command may be called to provide the status of the migration, as described above. The command may receive the pool identifier received after calling start-migration. In some embodiments, describe-migration-status may receive the address prefixes instead of, or in addition to, the pool identifier. A response may be returned indicating whether the migration has succeeded, failed, or is still pending.

In some embodiments, API 700 may also include an assign-pool-location 706 command which may be used to assign the address pool to a particular region and/or area of provider network 100. The command may receive the pool identifier and a region or area identifier. API 700 may also include a deploy-pool 708 command, which receives the identifier of the pool and upon calling causes the pool to be deployed to its assigned region. API 700 can include an advertise-migration 710 command, which causes the specified pool to be advertised in its assigned region. Similarly, a withdraw-advertising 712 command may cause the specified pool to no longer be advertised in its assigned region. To remove the addresses that have been migrated to provider network 100, a deprovision-migration 714 command can cause the address space to be removed from the provider network (e.g., removed from any regional control planes to which it had been added).

In some embodiments, the API 700 may include an undeploy-pool 716 command, which can receive a pool identifier and remove the pool from the region and/or area to which is has been deployed. The API may also include a describe-pools 718 command which receives an area identifier and provides pool details for each pool (e.g., pool size, addresses in use, etc.) in the specified area. The API may also include an allocate-address 720 command, which can allocate a specific pool from which to allocate addresses from (e.g., a random address), and an allocate address 722 command which can specify a specific address to be allocated from a given pool.

Figure 8:
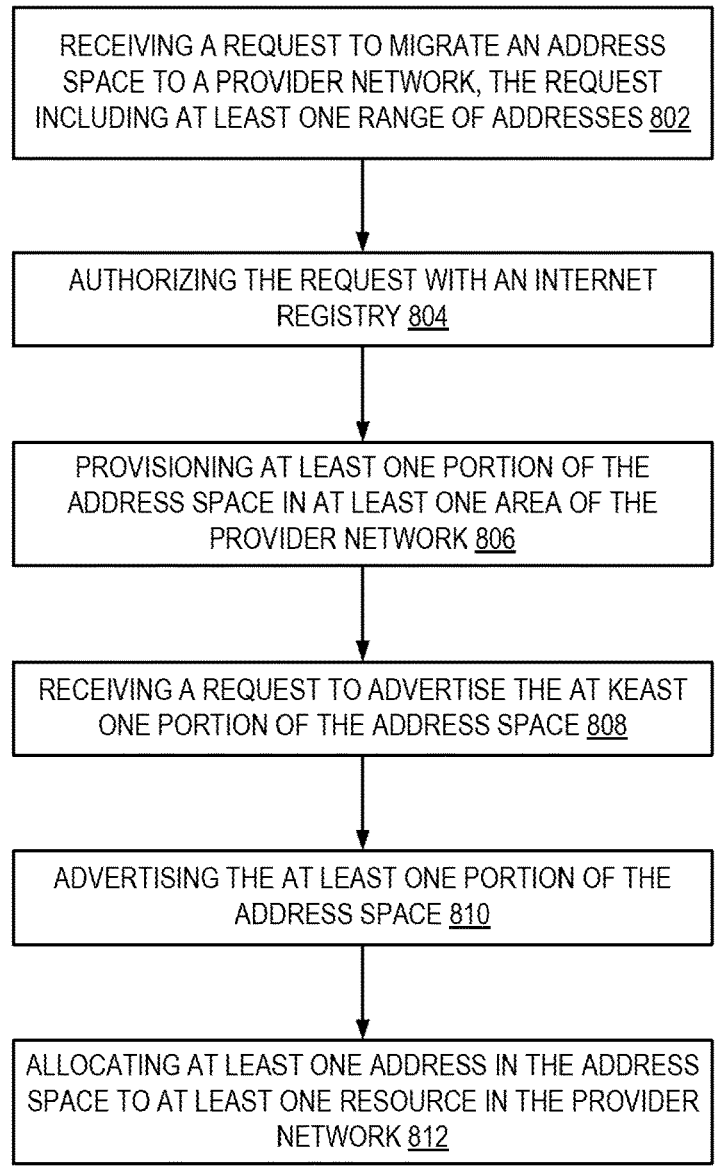
FIG. 8 is a flow diagram illustrating operations of a method for address migration according to some embodiments.

FIG. 8 is a flow diagram illustrating operations 800 of a method for address migration according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by the address migration service 102 of the other figures.

The operations 800 include, at block 802, receiving a request to migrate an address space to a provider network, the request including at least one range of addresses. The request may be carried by an HTTP GET or POST request message, and may be received at an endpoint of a provider network, which thereafter may forward the request on to an address migration service 102.

The operations 800 include, at block 804, authorizing the request with an internet registry. In some embodiments, authorizing may include obtaining a route origin authorization object associated with the address space from the internet registry, and determining that the route origin authorization object includes an identifier associated with the provider network. In some embodiments, authorizing the request may further include verifying ownership of the address space using an authorization object obtained from the route origin authorization object and/or from a reverse DNS lookup of the DNS entry associated with the address space, as discussed above.

The operations 800 include, at block 806, provisioning the at least one portion of address space in at least one area of the provider network. In some embodiments, provisioning may include adding the address space to a control plane of a first area of the provider network, and adding the address space to a control plane of a second area of the provider network.

The operations 800 include, at block 808, receiving a request to advertise the at least one portion of the address space. The request may be carried by an HTTP GET or POST request message (or other messages and/or protocols), and may be received at an endpoint of a provider network, which thereafter may forward the request on to an address migration service 102. In some embodiments, receiving a request to advertise the address space may further include receiving a request to advertise a portion of the address space from a first area of the provider network, and advertising the subset of the address space. The operations 800 include, at block 810, advertising the at least one portion of the address space. The operations 800 include, at block 812, allocating at least one address in the address space to at least one resource in the provider network.

In some embodiments, the operations 800 may further include authenticating the request to migrate the address space, wherein authenticating includes at least one of: decrypting at least a portion of the route origin authorization object to obtain an authorization object, or obtaining the authorization object from a domain name service entry associated with the address space.

In some embodiments, the operations 800 may further include creating a first address pool in the first area of the provider network using the address space, allocating a plurality of network addresses from the first address pool to a first plurality of resources in the first area of the provider network, creating a second address pool in the second area of the provider network using the address space, allocating the plurality of network addresses from the address pool to a second plurality of resources in the second area of the provider network, each resource from the second plurality of resources corresponding to and sharing a network address with a resource from the first plurality of resources, and advertising the address space from the first area of the provider network. In some embodiments, authorization data (e.g., the authorization object) may be obtained in a reverse DNS lookup from a record in a DNS entry associated with the address space.

In some embodiments, the operations 800 may further include detecting a failover event, stopping advertising the address space from the first area of the provider network, and advertising the address space from the second area of the provider network. In some embodiments, the first address pool comprises a plurality of sub pools, each sub pool associated with an account access policy, and wherein allocations from each sub pool are managed by a cross-account authentication service In some embodiments, the operations 800 may further include receiving a migration status request, and sending a migration status response indicating a status of the address space, the status of the address space include one of: has been provisioned, provisioning, has been deprovisioned, or is advertised In some embodiments, the operations 800 may include receiving a request to migrate an internet protocol (IP) space to a provider network, the request including at least one range of addresses and a description of the at least one range of addresses, returning an IP pool identifier associated with the IP space, requesting a route origin authorization object from a regional internet registry associated with the IP space to authorize the request, receiving a request to assign the IP pool to an area of the provider network, provisioning the IP pool in the area of the provider network and at least one secondary area of the provider network, receiving a request to advertise the IP pool from the area of the provider network, advertising the IP pool from the area of the provider network, and allocating at least one address in the IP pool to at least one compute instance in the provider network.

In some embodiments, the operations 800, may include allocating the at least one address in the IP pool to at least one second compute instance in at least one secondary area of the provider network. In some embodiments, the operations 800, may include stopping advertising from the area of the provider network, and advertising from the at least one secondary area of the provider network.

In some embodiments, the operations 800, may further include creating an address pool in the first area of the provider network using the address space, wherein the address pool comprises a plurality of sub pools, each sub pool associated with an account access policy, and wherein allocations from each sub pool are managed by an authentication service.

Figure 9:
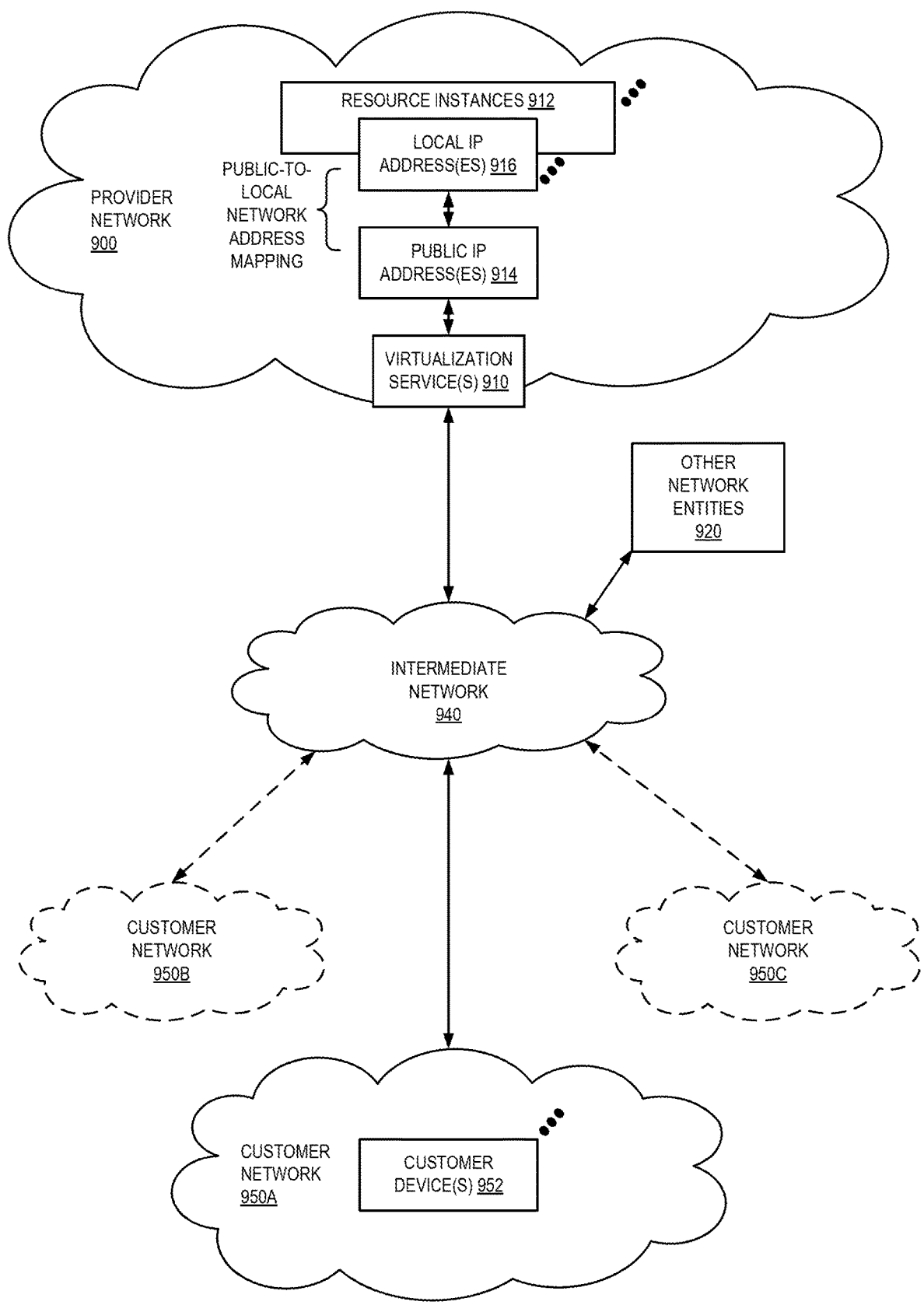
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900. As discussed above, the public IP addresses may include address space owned by the customer and migrated to provider network 900. The customer-owned and migrated address space may be in addition to provider network-owned address space. The migrated address space may be allocated to the customer's resources and deallocated back to an address pool specific to that customer, while provider network-owned address space may be made available to various customers of the provider network.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The customer may similarly allocate addresses from their own address space after the address space has been migrated to provider network 900, in accordance with various embodiments discussed above The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances. In some embodiments, the customer IP addresses may be allocated from address space provided by provider network 900 and/or address space owned by the customer and migrated to the provider network.

Figure 10:
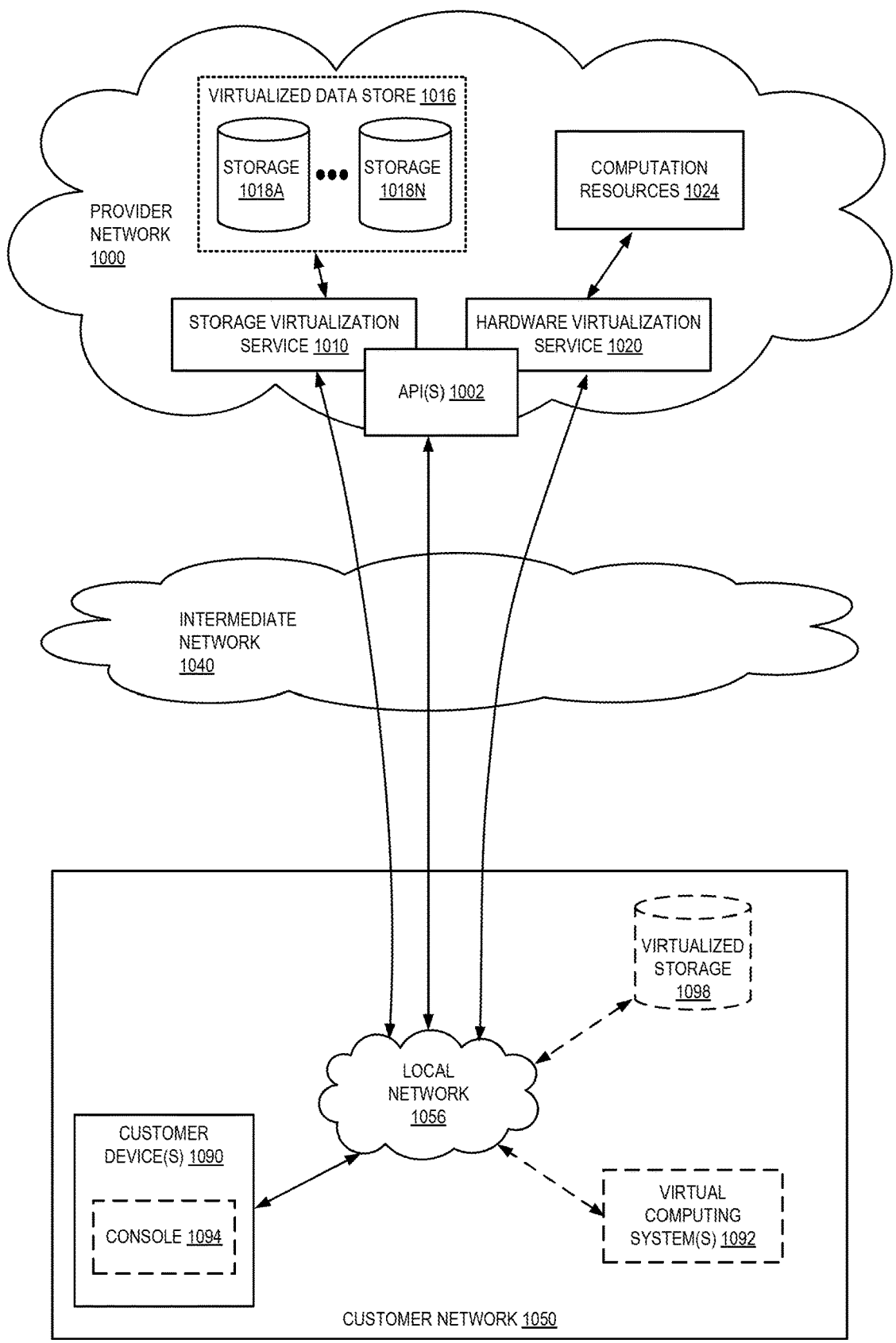
FIG. 10 is a block diagram of an example provider network that provides a storage virtualization service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., compute instances such as VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

In some embodiments, a new computation resource 1024, such as a compute instance, may be launched and allocated an address from a migrated address space owned by the user, as described above. The customer may launch the compute instance via a console or other user interface and may configure details of that instance, such as the network and subnet to which the instance belongs. In some embodiments, the customer may manually assign an address from the migrated address space for the new instance or specify a pool from which to allocate an address to the new instance. For example, the customer may select a pool created from their migrated address space when configuring the instance and, when the instance is launched, an address from the migrated address space (via the corresponding pool) can be allocated to the instance.

From an instance of a virtual computing system 1092 and/or another customer device 1090 (e.g., via console 1094), the customer may access the functionality of storage virtualization service 1010, for example via one or more APIs 1002, to access data from and store data to storage resources 1018A-1018N of a virtual data store 1016 provided by the provider network 1000. In some embodiments, a virtualized data store gateway (not shown) may be provided at the customer network 1050 that may locally cache at least some data, for example frequently accessed or critical data, and that may communicate with virtualized data store service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes, which appear to the user as local virtualized storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
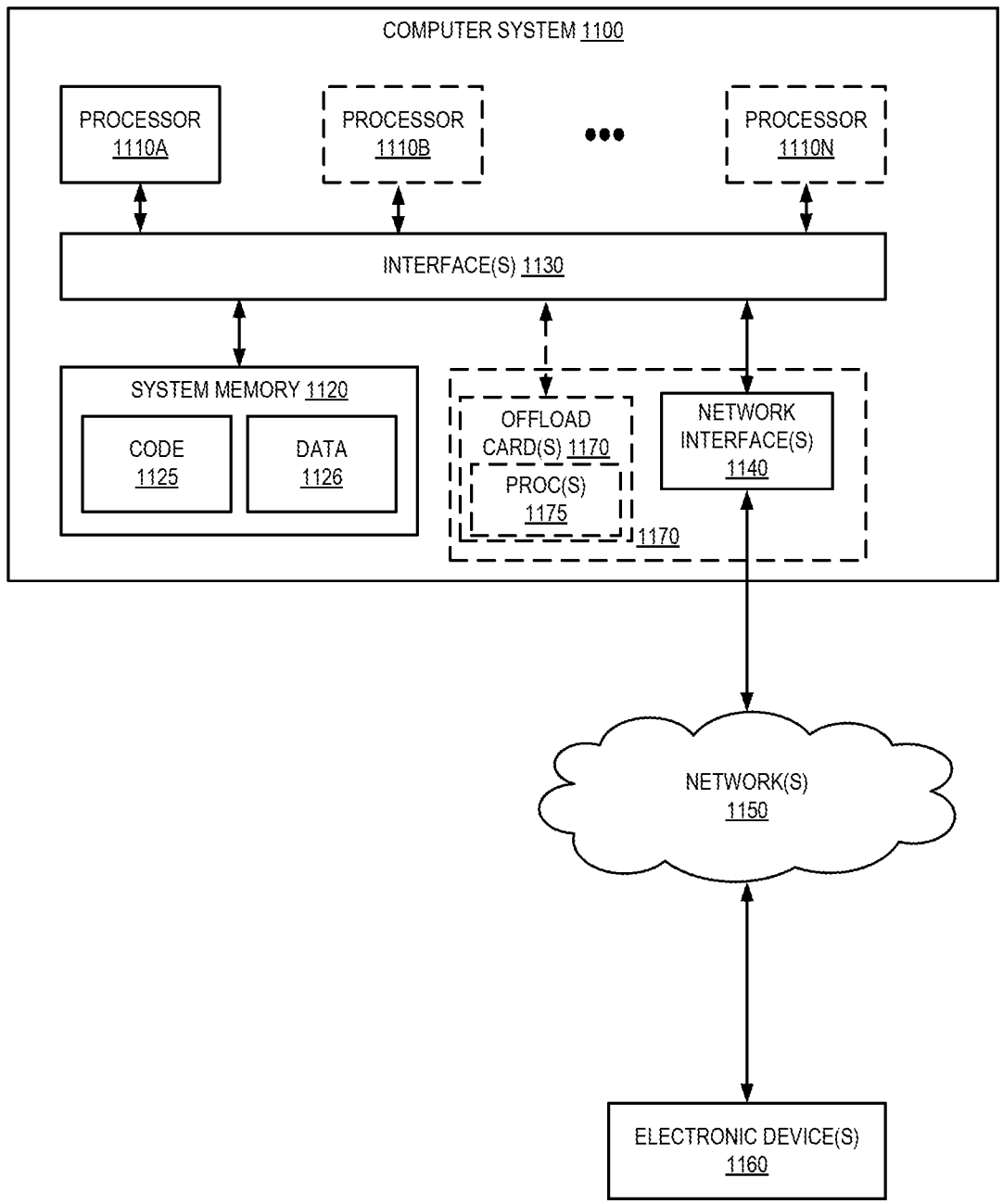
FIG. 11 is a block diagram illustrating an example computer system that may be used in some embodiments.

In some embodiments, a system that implements a portion or all of the techniques for address migration as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 124A-124C, 210A-210C, 302A-302F, 404A, 404B, 406A-406D, 606A-606D, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an endpoint of a provider network, a request to migrate an internet protocol (IP) space to the provider network, the request including at least one range of addresses and a description of the at least one range of addresses;
   authorizing the request using a route origin authorization object from a regional internet registry associated with the IP space, wherein prior to receiving the request to migrate the IP space to the provider network, the regional internet registry associated with the IP space receives a request to update the route origin authorization object to include an autonomous system identifier associated with the provider network;
   receiving a request to assign an IP pool corresponding to the IP space to an area of the provider network;
   provisioning the IP pool in the area of the provider network and at least one secondary area of the provider network;
   receiving a request to advertise the IP pool from the area of the provider network;
   advertising the IP pool from the area of the provider network; and
   allocating at least one address in the IP pool to at least one compute instance in the provider network.

2. The computer-implemented method of claim 1, further comprising:
   allocating the at least one address in the IP pool to at least one second compute instance in at least one secondary area of the provider network.

3. The computer-implemented method of claim 2, further comprising:
   stopping advertising from the area of the provider network; and
   advertising from the at least one secondary area of the provider network.

4. A computer-implemented method comprising:
   receiving a request to migrate an address space to a provider network, the request including at least one range of addresses;
   authorizing the request with an internet registry based at least on a route origin authorization object associated with the address space, wherein prior to receiving the request to migrate the address space to the provider network, the internet registry associated with the IP space receives a request to update the route origin authorization object to include an autonomous system identifier associated with the provider network;
   provisioning at least one portion of the address space in at least one area of the provider network;
   receiving a request to advertise the at least one portion of the address space;
   advertising the at least one portion of the address space; and allocating at least one address in the at least one portion of address space to at least one resource in the provider network.

5. The computer-implemented method of claim 4, wherein authorizing the request with an internet registry, further comprises:
 obtaining the route origin authorization object associated with the address space from the internet registry; and
 determining that the route origin authorization object includes the autonomous system identifier associated with the provider network.

6. The computer-implemented method of claim 5, further comprising:
 authenticating the request to migrate the address space, wherein authenticating includes at least one of:
  decrypting at least a portion of the route origin authorization object to obtain an authorization object; or
  obtaining the authorization object from a domain name service entry associated with the address space.

7. The computer-implemented method of claim 4, wherein provisioning the address space in at least one area of the provider network, further comprises:
 adding the address space to a control plane of a first area of the provider network; and
 adding the address space to a control plane of a second area of the provider network.

8. The computer-implemented method of claim 7, further comprising:
 creating a first address pool in the first area of the provider network using the address space;
 allocating a plurality of network addresses from the first address pool to a first plurality of resources in the first area of the provider network;
 creating a second address pool in the second area of the provider network using the address space;
 associating the plurality of network addresses from the second address pool to a second plurality of resources in the second area of the provider network, each resource from the second plurality of resources corresponding to and sharing a network address with a resource from the first plurality of resources; and
 advertising the address space from the first area of the provider network.

9. The computer-implemented method of claim 8, further comprising:
 detecting a failover event;
 stopping advertising the address space from the first area of the provider network; and
 advertising the address space from the second area of the provider network.

10. The computer-implemented method of claim 4, further comprising:
 creating an address pool in the first area of the provider network using the address space, wherein the address pool comprises a plurality of sub pools, each sub pool associated with an account access policy, and wherein allocations from each sub pool are managed by an authentication service.

11. The computer-implemented method of claim 4, wherein receiving a request to advertise the address space further comprises:
 receiving a request to advertise a portion of the address space from a first area of the provider network; and
 advertising the portion of the address space.

12. The computer-implemented method of claim 4, further comprising:
 receiving a migration status request; and
 sending a migration status response indicating a status of the address space, the status of the address space include one of: has been provisioned, provisioning, has been deprovisioned, or is advertised.

13. A system comprising:
 a hardware virtualization service implemented by a first one or more electronic devices, the hardware virtualization service to provide one or more instances in a provider network;
 an migration service implemented by a second one or more electronic devices, the migration service including instructions that upon execution cause the migration service to:
  receive a request to migrate an address space to the provider network, the request including at least one range of addresses;
  authorize the request with an internet registry based at least on a route origin authorization object associated with the address space, wherein prior to receiving the request to migrate the address space to the provider network, the internet registry associated with the IP space receives a request to update the route origin authorization object to include an autonomous system identifier associated with the provider network
  provision the at least one portion of the address space in at least one area of the provider network;
  receive a request to advertise the at least one portion of the address space; and
  advertise the at least one portion of the address space, wherein at least one address in the address space is allocated to at least one instance provided by the hardware virtualization service in the provider network.

14. The system of claim 13, wherein the instructions to authorize the request with an internet registry, when executed, further cause the migration service to:
 obtain the route origin authorization object associated with the address space from the internet registry; and
 determine that the route origin authorization object includes the autonomous system identifier associated with the provider network.

15. The system of claim 14, wherein the instructions, when executed, further cause the migration service to:
 authenticate the request to migrate the address space, wherein authenticating includes at least one of:
  decrypting at least a portion of the route origin authorization object to obtain an authorization object; or
  obtaining the authorization object from a domain name service entry associated with the address space.

16. The system of claim 13, wherein the instructions to provision the address space in at least one area of the provider network, when executed, further cause the migration service to:
 add the address space to a control plane of a first area of the provider network; and
 add the address space to a control plane of a second area of the provider network.

17. The system of claim 16, further comprising:
 an address allocation service implemented by a second one or more electronic devices, the address allocation service including instructions that upon execution cause the address allocation service to:
  create a first address pool in the first area of the provider network using the address space;
  allocate a plurality of network addresses from the first address pool to a first plurality of instances in the first area of the provider network;

create a second address pool in the second area of the provider network using the address space;

associate the plurality of network addresses from the second address pool to a second plurality of instances in the second area of the provider network, each instance from the second plurality of instances corresponding to and sharing a network address with a instance from the first plurality of instances; and advertising the address space from the first area of the provider network.

18. The system of claim 17, wherein the instructions, when executed, further cause the migration service to:

detect a failover event;

stop advertising the address space from the first area of the provider network; and advertise the address space from the second area of the provider network.

19. The system of claim 13, wherein the instructions, when executed, further cause the migration service to:

creating an address pool in the first area of the provider network using the address space, wherein the first address pool comprises a plurality of sub pools, each sub pool associated with an account access policy, and wherein allocations from each sub pool are managed by a authentication service.

20. The system of claim 13, wherein the instructions to receive a request to advertise the address space, when executed, further cause the migration service to:

receive a request to advertise a portion of the address space from a first area of the provider network; and advertise the portion of the address space.

\* \* \* \* \*